Patented June 23, 1953

2,643,250

UNITED STATES PATENT OFFICE 2,643,250

ISOCYANATE DIMERS AS COLOR FORMING INTERMEDIATES

Otto Stallmann, Bridgeton, N. J., and Esley O. Langerak, Wilmington, Del., assignors to E. I. du Pont de Nemours & Company, Wilmington, Del., a corporation of Delaware No Drawing. Application November 16, 1951, Serial No. 256,819

3 Claims. (Cl. 260—239)

This invention relates to the preparation of stable isocyanate derivatives of dyes and color-forming intermediates useful in the preparation of dyes. The invention relates more particularly to new dyes and color-forming intermediates which contain an aromatic isocyanate dimer nucleus which when applied to textiles, paper, leather, etc., exhibit improved fastness to washing.

It is recognized in the field of dyes, particularly for cotton and other cellulose fibers, that many of the compounds which dye these materials in light-fast shades are frequently deficient in their fastness to washing. This problem exists particularly in the field of direct dyes which are used in dyeing cellulose material, and in many of the developed dyes particularly of the azo class. As will be illustrated, the invention is not limited to dyes which find their primary use in the dyeing of cellulose materials but is also applicable to the preparation of colors and color intermediates with improved wet fastness which may also be used in the coloring of paper, leather and the nitrogenous-containing fibers such as wool, silk, nylon, etc., or, in other words, for use in the coloring of any material with which isocyanate groups react to effect a chemical bond.

It is therefore an object of the present invention to produce dyes and dye intermediates containing isocyanate dimer linkages which exhibit improved wash fastness when applied to textiles, paper, leather and other materials with which isocyanate groups react.

The compounds of the present invention have the following general formula:

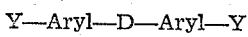

in which D stands for a linkage involving two isocyanate groups of aromatic isocyanates that result from what will be referred to hereinafter as a "dimerization reaction"; Aryl stands for the nucleus of an aromatic compound capable of functioning as the diazo component of an azo dye; and Y stands for a radical of the group consisting of —NH₂ and —N=N—R in which R is an azo coupling component. In each case Aryl stands for the nucleus of an aromatic compound capable of being converted to an isocyanate which in turn can be dimerized either with itself or with another aryl isocyanate to form a stable dimer which can be broken down with heat, as hereinafter described.

While in the literature it has generally been assumed that the dimerization of aromatic isocyanates produces uretidine-dione rings of the formula:

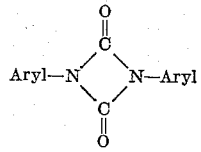

there are indications due to the chemical reactivity of the dimers that the polymerization of two aromatic isocyanate molecules gives the 1,3-oxazetidine ring of the formula:

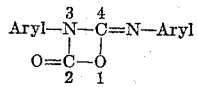

The invention of the present application is not based on a particularly theoretical molecular arrangement but on the known fact that the isocyanates, when polymerized to a dimer, irrespective of the chemical formula that may be assigned thereto, are rendered relatively inactive so that compounds containing them can be subjected to various chemical reactions without destroying the potential value of the isocyanate groups, yet on heating the dimer is split, resulting in the liberation of free isocyanate groups which can then react with materials containing reactive hydrogen or other compounds with which it is known that compounds containing free isocyanate groups will react.

In general, the aryl isocyanates may be prepared either from the aromatic nitroamines or aromatic nitrocarboxylic acids which are converted to isocyanate compounds by known reactions. These aromatic monoisocyanates may then be converted to stable dimers by a dimerization reaction using pyridine as the catalyst, or by using mixed aromatic phosphines as more particularly described in co-pending application Serial No. 248,270.

Where the aryl compounds carry amino groups they are diazotized and then coupled with any of the usual azo coupling components to form dyes which, after application and drying on the material to be colored, are fixed thereto by a heating operation which splits the isocyanate dimer and permits the isocyanate group to attach itself to reactive groups such as through reactive hydrogen in the materials which are to be dyed.

The stable isocyanate dimer intermediates or dyes, as hereinafter illustrated, make it possible to obtain wash-fast colors with dyes heretofore possessing poor or mediocre washfastness. It is believed that this is due to direct chemical reaction between the reactive hydrogen atoms in the textile and the free —NCO groups formed when the dimeric isocyanate group of the stable intermediate is ruptured. With cellulose —OH groups, for example, a urethane linkage would result. This rupturing is brought about by heating the textile, paper or leather, etc., on which the stable intermediate has been deposited, to temperatures of from 120° to 200° C. for varying lengths of time, longer times being required for lower temperatures. Preferably, from 3 to 10 minutes at from 150° to 170° C. is used.

The compounds may be used in different ways according to the wish of the operator. Thus, on the one hand, the stable intermediate may be formed to include the entire dye molecule and the dyeing may be carried out as with direct dyeing. After the dye has been applied, the fabric is dried at from 100° to 105° C. in a conventional manner such as in a continuous drying oven. After drying, the fabric is baked, again in a conventional type of curing oven. Normally this will be carried out in a continuous manner, the dried cloth passing in one end of the oven and passing over rolls in the oven for a fixed time and then emerging as the baked or cured fabric with the dye chemically bound to the textile.

On the other hand, the stable intermediate may have reactive groups such as amino groups which are further reacted or coupled to other intermediates to form the dye. In this case the dimer-containing intermediate may be anchored to the textile first by heat treatment and then the dye molecule may be formed on free reactive portion. If the free portion is an —NH₂ group, it may be diazotized and then coupled in the same manner as is used in the so-called "ice" colors.

In some cases it is desirable to remove water from the fabric completely before the dyeing operation or after, after which the heating to break the dimer ring and cause reaction with the fiber is carried out. It is believed that the freed —NCO groups react with the —OH groups of the cellulose more readily in the absence of water. On the other hand, this is not so important when the material to which the —NCO group is to react contains —NH₂ groups, for the —NCO appears to react with them more readily than with water.

The following examples are given to illustrate the invention. The parts used are by weight. In these examples, "D" refers to the isocyanate dimer nucleus, as identified above.

*Example 1*

One hundred (100) parts of p-nitrophenylisocyanate, prepared by the well-known reaction of phosgene on p-nitroaniline, is dissolved in 1100 parts of dry nitrobenzene. Three to five drops of dimethylphenylphosphine are added, and after standing four hours at room temperature the solid mass of pale yellow crystals which has formed is removed by filtration, washed well with petroleum ether, carbon tetrachloride or acetone, and dried at temperatures up to 75° C. The dried product melts at from 209° to 211° C. and has the following probable formula:

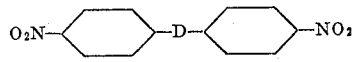

Eight and one-half (8.5) parts of the dimer in 140 parts of benzene is catalytically reduced with 5 parts of a 3% palladium-on-charcoal catalyst under 46 pounds hydrogen pressure during two hours at from 26° to 31° C. The catalyst and charcoal are removed by filtration, the carbon cake is extracted with 160 parts of acetone and the combined acetone-benzene solution is evaporated to dryness. The product obtained is a pale gray powder which does not melt sharply. It is readily soluble in dilute acids and may be tetrazotized at 0° C. by the usual diazotization processes.

The structure of the product is believed to be:

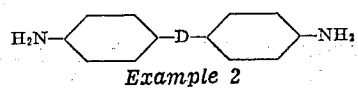

*Example 2*

1-amino-4-nitronaphthalene is converted to the 1-nitro-4-naphthalene isocyanate by means of phosgene employing well known methods. One hundred (100) parts of said isocyanate are dimerized in 2000 parts of alpha-methyl-naphthalene while standing for 8 hours at 35° C. in the presence of .4 part of dimethyl phenylphosphine. The isocyanate dimer obtained is removed by filtration, washed with 50 parts of benzene, then with carbon tetrachloride and dried at from 50° to 60° C. Ten (10) parts of the dimer thus prepared is catalytically reduced by following the reduction process of Example 1 and the amino compound is isolated as described in that example.

The end product is believed to have the following formula:

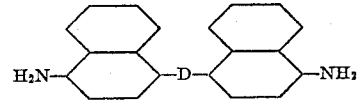

*Example 3*

(a) 6.3 parts of the diaminophenyl dimer prepared as in Example 1 is dissolved in 7.1 parts of 10 Normal hydrochloric acid and 100 parts of water added. It is cooled to 0°±1° C. and 6.6 parts of 5 Normal sodium nitrite solution is added and the solution is stirred for 30 minutes. The excess sodium nitrite is destroyed by adding a 1 molar solution of sulfamic acid slowly until a blue color on starch-iodide indicator paper is no longer obtained. The solution is clarified by adding approximately 1 part of activated carbon, stirring and filtering.

(b) 55 parts of this diazo solution is then added slowly to a solution of 3.54 parts of 1-phenyl-3-methyl pyrazolone-5 in 100 parts of water and 5.6 parts of 10 Normal sodium hydroxide and 5.5 parts of 2 Normal sodium carbonate. A red precipitate is formed rapidly. It is filtered off, washed with water and dried. The product has the following structural formula:

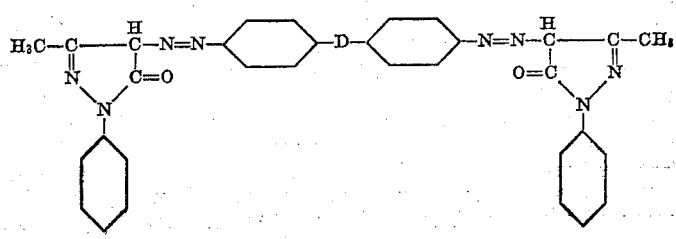

(c) A piece of cotton broadcloth weighing 5 parts is soaked in water for about 15 minutes. It is then wrung out and soaked in acetone for about 15 minutes. It is wrung out again and then soaked 15 minutes in pyridine. This effectively removes water from the fiber and leaves it in a swollen condition.

1.5 parts of the dye prepared above is dissolved in 150 parts of dimethyl formamide, the fabric still wet with pyridine is added, and heated at reflux for two hours. The fabric is removed, rinsed with acetone and then with water and soaped lightly to remove surface dye. The fabric is dyed a yellow color.

It is believed that the dimer portion of the molecule is ruptured and the freed —NCO groups react with the —OH groups of the cotton to give a urethane linkage as follows:

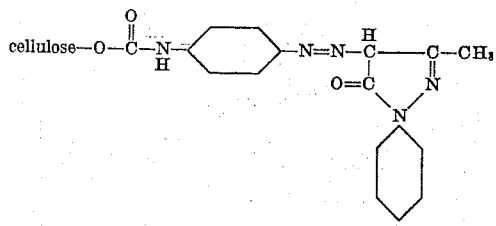

(d) When the dyed fabric is washed with a 0.5% sodium oleate soap solution at 100° C. for one hour there is no loss of color. This same dye without the anchoring urethane linkage is practically all removed from the cloth in a similar wash.

(e) Another sample of the dyeing is extracted for one hour in boiling dimethyl formamide. An 80%–85% retention of color on the fiber is observed. An unanchored dye is essentially completely removed by this stripping operation.

(f) Another sample of the dyeing was discharged with alkaline sodium hydrosulfite to a colorless fabric. The fabric was rediazotized and coupled with 1-phenyl-3-methyl pyrazolone-5 and the original color was redeveloped in essentially full strength.

[Example 3 (b)] and the dye is isolated. The dye has the following structure:

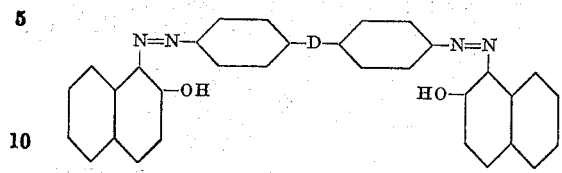

Cotton broadcloth was dyed with the dye in the same manner as in Example 3 (c) except that o-dichlorobenzene is used as the solvent in place of dimethyl formamide. Prolonged extraction with dimethyl formamide which normally would extract all of the dye, showed about 50% color retention on the fabric due to chemically bonding through the isocyanate linkages. The cloth was dyed a brown color.

*Example 5*

The diazotized amine of Example 3 (a) is coupled with 1-(m-sulfophenyl)-3-methyl pyrazolone-5 in the conventional manner and the dye of the following structure is recovered:

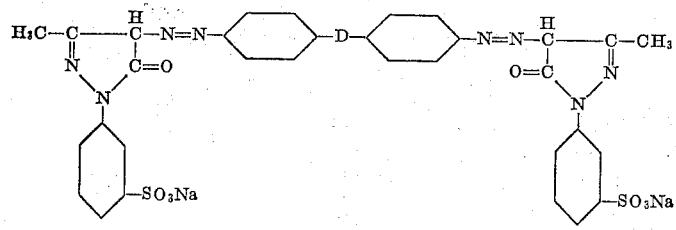

On dyeing cotton broadcloth from a 2% aqueous solution at from 50° to 60° C. for 30 minutes followed by addition of sodium sulfate to obtain exhaustion, an orange-yellow color is obtained. The fabric is then rinsed with acetone to replace the water. One-half of the fabric is then heated in pyridine at the reflux for two hours to split the dimer ring and attach the dye to the fabric. The treated fabric is compared to the untreated fabric for retention of dye on boiling with 5% soap solution for one hour. Considerably more dye is retained on the fabric in the case of the pyridine treated fabric.

When the sodium salt of benzoyl J-acid is substituted for the 1-(m-sulfophenyl)-3-methyl pyrazolone-5 a purple dye is obtained with essentially the same fastness properties.

The dye has the formula:

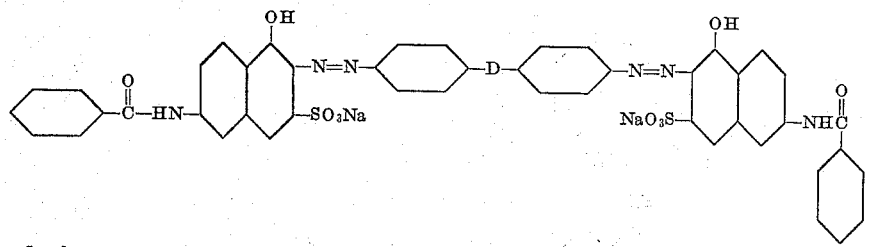

*Example 4*

The diazotized amine of Example 3 (a) is coupled to beta-naphthol in the conventional way

*Example 6*

The diazotized amine of Example 3 (a) is coupled with R-salt to give a dye with the structure:

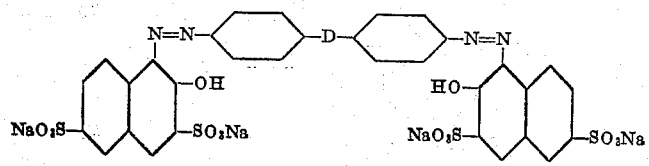

This compound dyed cotton a red color with a bluish shade.

As further illustrative of the aminoisocyanate dimers which may be used as tetrazo components according to this invention can be mentioned the following:

1. 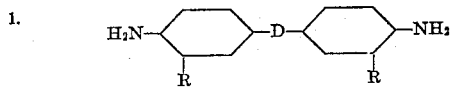

in which R is alkyl, alkoxy, halogen, —CO-alkyl, —CO-aryl, —COO-alkyl, etc., in which the alkyl and aryl radicals contain up to 7 carbon atoms, for example:

(a) 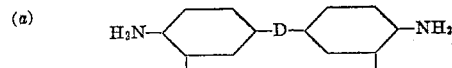

(b) 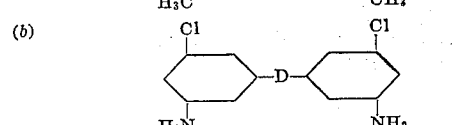

(c) 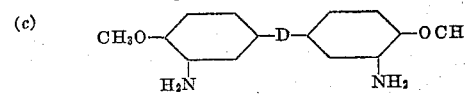

and those in which the amino group is an aryl radical more remote from the dimer, such as:

2. 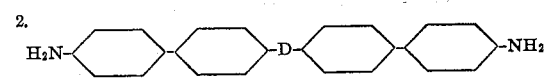

3. 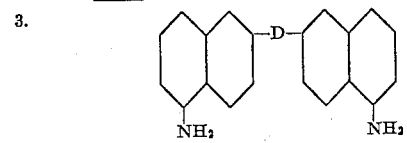

4. 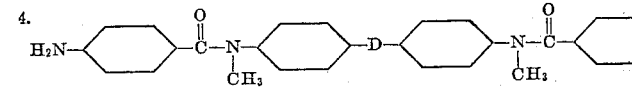

5. 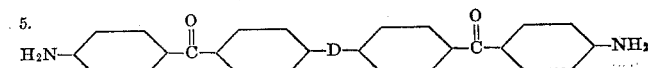

6. 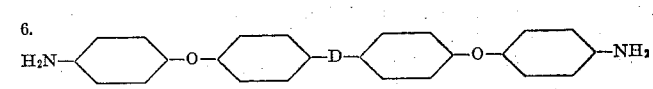

Also, in a similar manner any of the azo dye coupling components may be substituted for those used in the specific examples. As further illustrative of this class may be mentioned those having the formula:

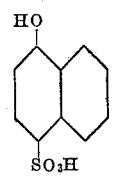

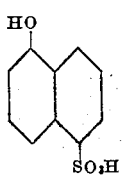

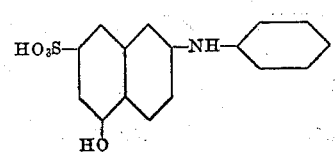

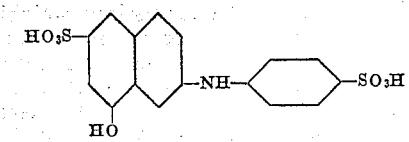

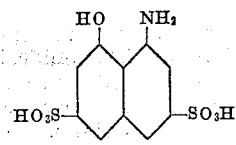

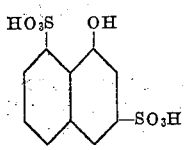

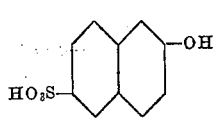

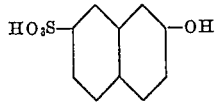

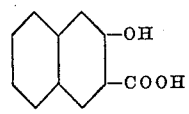

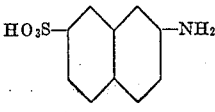

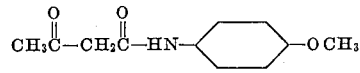

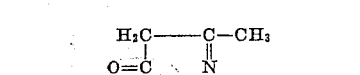

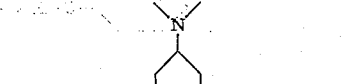

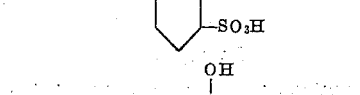

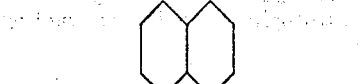

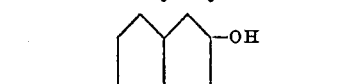

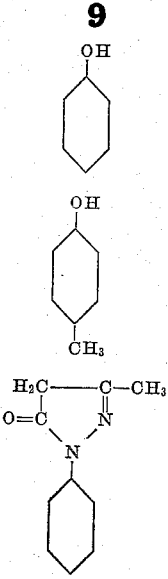

It is of course understood that the present invention is not limited to the specific examples or the alternatives listed above but may be applied in the manner clearly illustrated to any compounds the azo component of which is capable of being converted to an isocyanate which carries groups that may be diazotized or serve as intermediates for the preparation of diazo compounds, and that the coupling components may be of any type desired for the preparation of dyes.

While the formulae given in the specific examples of how the dye is chemically linked to the cellulose or other material to be dyed is believed to be a logical explanation of the attachment of these new isocyanate compounds to the fibers or other substrate, it is of course understood that the invention is not limited by any theory or formula with respect to this attachment. The invention is based on the fact that these isocyanate compounds, when heated in a manner that normally splits the isocyanate dimer radical, fix themselves to textile and other materials much more firmly than when the compounds do not carry the isocyanate group.

We claim:

1. The compounds of the following general formula:

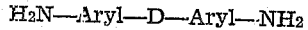

in which Aryl—D—Aryl stands for a dimer of aryl isocyanates of the benzene and naphthalene series.

2. The compound of the general formula:

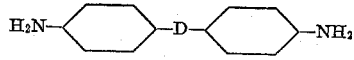

in which D stands for an isocyanate dimer linkage between the two phenyl nuclei.

3. The compound of the general formula:

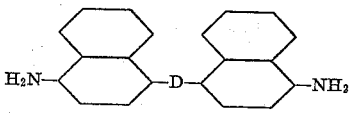

in which D stands for an isocyanate dimer linkage between the two phenyl nuclei.

OTTO STALLMANN.
ESLEY O. LANGERAK.

No references cited.